March 17, 1942. F. M. McMILLAN ET AL 2,277,022
METHOD FOR EXECUTING CATALYZED VAPOR PHASE REACTIONS
Filed June 10, 1940
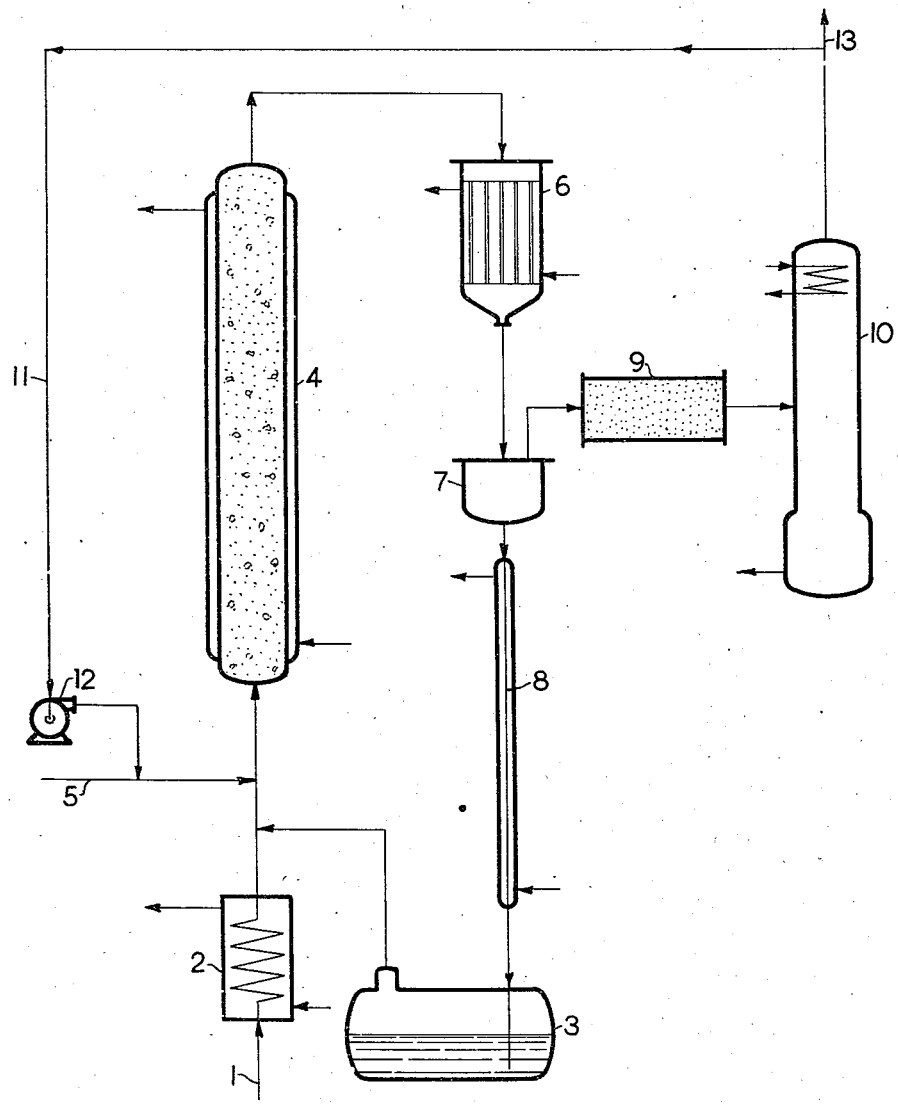
Inventors: Frank M. McMillan
George S. Parsons
By their Attorney:

Patented Mar. 17, 1942

2,277,022

UNITED STATES PATENT OFFICE 2,277,022

METHOD FOR EXECUTING CATALYZED VAPOR PHASE REACTIONS

Frank M. McMillan and George S. Parsons, Berkeley, Calif., assignors to Shell Development Company, San Francisco, Calif., a corporation of Delaware Application June 10, 1940, Serial No. 339,733

3 Claims. (Cl. 260—676)

The present invention relates to a method for the execution of reactions with the aid of catalysts under conditions at which both the reactants and catalysts normally exist in the vapor phase. Particular aspects of the invention relate to a method for the execution of vapor phase reactions for volatile catalysts such as aluminum chloride and aluminum bromide. A further more particular aspect of the invention relates to a new and improved method for the isomerization of saturated hydrocarbons, such in particular as normal butane at higher-than-usual temperatures in the vapor phase with the aid of aluminum chloride.

The aluminum halides, particularly aluminum chloride and aluminum bromide, are very versatile catalysts. Aluminum chloride, for example, finds application in such reactions as the isomerization of saturated hydrocarbons, the polymerization of olefins, the alkylation of olefin hydrocarbons with paraffin hydrocarbons, the cracking of hydrocarbons, Friedel-Crafts syntheses, etc. In these various reactions it is the practice to employ the aluminum chloride as a solid, usually in the form of a fine powder slurried in the reaction mixture. In such cases where the reactants are in the vapor phase it is the practice to employ the aluminum chloride either in the form of lumps or deposited upon a suitable carrier material. In these various processes the aluminum chloride has been used in the solid state primarily because it is in this state that it is the most active catalyst. Thus, it is well known that the catalytic activity of aluminum chloride in the liquid state (i. e. dissolved in the reactants) is of a much lower order of magnitude.

The application of aluminum chloride in the solid state, although it affords by far the best catalytic activity, has certain disadvantages. Since aluminum chloride sublimes at about 180° C. and melts at about 190° C. under 2½ atmosphere pressure, it is necessary when employing solid aluminum chloride to employ very moderate temperatures, for instance below about 180° C. Also, in order to avoid rapid removal of the catalyst from the reaction zone by volatilization even at more moderate temperatures, for instance at temperatures of about 100° to 150° C., it is necessary to employ superatmospheric pressure. Since, however, the reactants usually liquefy at quite moderate pressures at these temperatures, the pressures which may be employed are quite limited. The loss of aluminum chloride from the reaction zone by volatilization may also be decreased somewhat by applying the aluminum chloride impregnated in a suitable adsorptive carrier material. In some cases, for instance when the carrier material is activated carbon, it appears that the vapor pressure of the aluminum chloride is decreased somewhat. In other cases, for example when the carrier material is an adsorptive alumina, a further advantage due to a pronounced promoting effect is realized. By employing the solid aluminum chloride impregnated into such carrier materials, it is possible to employ temperatures at or near the sublimation or melting point of the aluminum chloride, for example temperatures up to about 200° C.

We have now found a method whereby aluminum chloride may be employed to catalyze these various vapor phase reactions in a most practical and economical way at higher-than-usual temperatures. According to the process of the invention, the reactant vapors in admixture with vapors of aluminum chloride or other catalyst, and if desired a promoter such as hydrogen chloride, is passed through a reaction zone packed with a suitable adsorptive solid and maintained under the desired reaction conditions. When operating according to the present method several distinct advantages may be realized. The more important of these advantages are:

1. Higher temperatures allowing much better reaction rates may be employed.
2. Higher pressures affording better contact may be employed.
3. Greater throughput capacities per reactor may be employed.
4. The necessity of preparing and charging a supported catalyst is eliminated.
5. The deposition of tars, etc. in the reactor is decreased.
6. Relatively constant conversions may be maintained over long periods of time.

The invention will be specifically described with reference to the drawing, but it is understood that the invention is not limited by the physical limitations of the apparatus illustrated and is capable of being executed in apparatus of other modifications than the one chosen for the purposes of illustration. Referring to the drawing, the material to be treated, for instance normal butane, is fed to the system either in the liquid or vapor phase via line 1 and is preheated. The preheater 2 is shown as a coil heater heated by circulating hot oil or other heating fluid through the surrounding jacket. The catalyst, for example aluminum chloride, is continuously vaporized in vaporizer 3 (heating means not shown) and the aluminum chloride vapors pass with the reactant vapors through the packed reaction chamber 4. Promoter vapors, for instance hydrogen chloride, are fed to the reactant vapors via line 5. The reaction chamber 4 is filled with pieces of a suitable adsorptive solid and is maintained at a desired reaction temperature by a suitable heating means such as by hot oil or the like. The vaporous reaction product, after passing through the reaction zone, passes through a condenser 6 wherein the aluminum chloride is selectively condensed. Condensed aluminum chloride is separated from the reacted vapors in a small separating device 7, and is returned to the vaporizer 3 via a pipe 8. In order to avoid solidification of the aluminum chloride, pipe 8 is shown surrounded with a jacket through which a suitable heating medium is circulated. In order to remove small amounts of uncondensed aluminum chloride from the reacted vapors leaving separator 7, the vapors may be passed through a chamber 9 packed with a suitable adsorptive solid such as adsorptive alumina. In such cases where an appreciable quantity of promoter is employed it is most economical to recover and recycle it. This may be effected by passing the product containing the promoter gas to a stripping column 10. The gaseous promoter (along with any hydrogen, if this is employed) is separated from the reacted vapors and recycled via line 11 and pump 12. A small amount of excess gas may be vented by line 13.

When employing a system such as illustrated in the drawing, it is necessary that the whole system be maintained under pressure. Pressures from 45 P. S. I. up to that causing condensation in the reaction zone are suitable. Since, however, the present process may be conveniently executed at temperatures above the critical temperatures of the reactants, high pressures affording better contact and higher throughput capacities may be conveniently employed. At pressures below about 45 P. S. I. aluminum chloride condenses to a solid rather than a liquid. If these lower pressures are employed it is therefore necessary to modify the apparatus illustrated in the drawing to provide for the condensation and recovery of solid aluminum chloride.

The process of the invention is suited for quite general application and may be employed in the vapor phase execution of such varied reactions as isomerization, polymerization, alkylation, disproportionation, and the like. One application for which the process is particularly suited is for the isomerization of saturated hydrocarbons, particularly the lower-boiling paraffin hydrocarbons such as butane and pentane and lower-boiling normally liquid hydrocarbon fractions. Another application for which the process is well suited is for the vapor phase polymerization of olefins.

The process of the invention is particularly adapted for the use of aluminum chloride and this catalyst will therefore generally be employed. The process is, however, not restricted to this catalyst. Other catalysts which may often be employed, according to the present method, with considerable advantage are aluminum bromide, boron fluoride and hydrogen fluoride. In such cases where aluminum chloride is employed at pressures less than 45 P. S. I., it is most advantageous to vaporize the aluminum chloride in vaporizer 3 from a molten solution. This is effected by mixing the aluminum chloride in vaporizer 3 with a less volatile salt such as NaCl or the like. This forms a molten mass from which the aluminum chloride may be more easily distilled into the feed at a constant, desired rate.

The reaction zone, according to the present invention, is packed with a solid adsorbent. In a preferred embodiment of the invention the solid adsorbent is a relatively catalytically inert aluminous material such as activated alumina, activated bauxite, activated kaolin, activated bentonite, activated Florida earth, activated fuller's earth, and the like. Other adsorptive materials, such as activated carbon, silica gel, chromium oxide gel, and the like, may also be employed. These materials, although they are essential in the process, are not in themselves the catalyst, but presumably act as convenient surfaces upon which the true catalyst vapors and the reactant vapors are brought together in a condition more favorable for reaction.

The process of the invention is executed at temperatures at which the reactants as well as the catalyst are normally in the vapor state. In such cases where aluminum chloride is employed, the temperature is above 200° C. and preferably above about 230° C. The use of such higher-than-usual temperatures in the present process is a distinct advantage since at these temperatures the reactions proceed faster, higher pressures allowing better contact and greater throughput capacities may be employed, and there is considerably less tendency for small amounts of polymers, tars, etc. to deposit. The upper practical temperature limit which may be employed is dependent upon the particular material being treated and is generally below that at which undesired degradation becomes pronounced. In the isomerization of butane, for example, temperatures from about 230° C. to about 450° C. are preferred.

In the usual application of the process where the catalyst employed is aluminum chloride or aluminum bromide it is essential that a suitable promoter be present. Hydrogen chloride, being both very efficient and inexpensive, is generally the preferred promoter. Other promoters such as hydrogen bromide and/or hydrogen fluoride may, however, also be employed. The amount of promoter preferably employed depends largely upon the particular material being treated and the other reaction conditions, and may vary considerably. Generally speaking, concentrations ranging from about 1 mol % to about 30 mol % and usually between about 2 mol % and about 15 mol % will be used.

In some cases, especially when heating relatively non-stable materials, some difficulty may be experienced due to degradation reactions. In such cases these undesirable side reactions may be repressed by effecting the reaction in the presence of a small amount of hydrogen. If hydrogen is employed, it is preferably recycled with the promoter.

The following example describing the isomerization of butane according to the process of the invention is submitted solely for the purpose of illustration and is not to be construed as limiting the invention in any way.

*Example*

A quartz reaction tube was packed with an adsorptive alumina and maintained at a temperature of about 300° C. Through the reaction zone there was passed at atmospheric pressure a gaseous mixture consisting of 81 mol % normal butane, 11 mol % aluminum chloride and 8 mol % hydrogen chloride. After condensing out the aluminum chloride from the product and separating the hydrogen chloride promoter, the product was found to have isomerized to approximately 22%. Degradation and other side reactions did not take place to any appreciable extent.

We have in the foregoing described our invention with particular reference to a preferred embodiment, namely, the isomerization of paraffin hydrocarbons (butane) with the aid of aluminum chloride vapors. The invention is, however, not restricted to this preferred embodiment but may also be employed with advantage for the execution of other reactions employing other volatile acid-acting catalysts of the Friedel-Crafts type such as aluminum bromide, boron fluoride, and hydrogen fluoride. These various embodiments are, therefore, considered to be a part of our invention.

We claim as our invention:

1. A method for the vapor phase isomerization of butane with the aid of aluminum chloride which comprises passing vapors of butane with vapors of aluminum chloride and vapors of a hydrogen halide promoter through a bed of an adsorptive alumina at a temperature above 230° C. but below that causing substantial cracking of the reactant vapors, and recovering and recycling aluminum chloride and hydrogen halide promoter from the vaporous reaction product.

2. A method for the vapor phase isomerization of butane with the aid of aluminum chloride which comprises passing vapors of butane with vapors of aluminum chloride and vapors of a hydrogen halide promoter through a bed of an adsorptive alumina at a temperature above 230° C. but below that causing substantial cracking of the reactant vapors.

3. A method for the vapor phase isomerization of butane with the aid of aluminum chloride which comprises passing butane vapors with vapors of aluminum chloride and a hydrogen halide promoter through a bed of a solid adsorbent at a temperature above 230° C. but below that causing substantial cracking of the reactant vapors.

FRANK M. McMILLAN.
GEORGE S. PARSONS.